(12) United States Patent
Kumamoto

(10) Patent No.: US 9,140,970 B2
(45) Date of Patent: Sep. 22, 2015

(54) PROJECTOR AND PROJECTOR CONTROLLING METHOD

(71) Applicant: SEIKO EPSON CORPORATION, Tokyo (JP)

(72) Inventor: Osamu Kumamoto, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 134 days.

(21) Appl. No.: 14/100,634

(22) Filed: Dec. 9, 2013

(65) Prior Publication Data

US 2014/0160446 A1    Jun. 12, 2014

(30) Foreign Application Priority Data

Dec. 12, 2012    (JP) ................................. 2012-271114

(51) Int. Cl.
*G03B 21/20* (2006.01)
*G06F 1/32* (2006.01)
*H04N 9/31* (2006.01)

(52) U.S. Cl.
CPC .......... *G03B 21/2053* (2013.01); *G06F 1/3203* (2013.01); *H04N 9/3179* (2013.01); *G09G 2330/022* (2013.01)

(58) Field of Classification Search
CPC ............................. G03B 21/20; G03B 21/14
USPC ......................... 353/85, 42; 399/75
See application file for complete search history.

(56) References Cited

U.S. PATENT DOCUMENTS 5,782,548 A * 7/1998 Miyashita ...................... 353/42

FOREIGN PATENT DOCUMENTS

JP    A-2012-132977    7/2012

* cited by examiner

*Primary Examiner* — William C Dowling
*Assistant Examiner* — Jerry Brooks
(74) *Attorney, Agent, or Firm* — Oliff PLC

(57) ABSTRACT

A projector includes a measurement unit having a function of measuring at least two of a period during which the projector remains powered on, a period of an in-use state in which a user is using the projector, and a period of a non-use state in which the user is not using the projector; and a control unit having a function, of determining an in-use state ratio or a non-use state ratio associated with the projector based on the periods measured by the measurement unit and a function of executing an energy saving setting based on the in-use state ratio or the non-use state ratio.

8 Claims, 6 Drawing Sheets

PROJECTOR AND PROJECTOR CONTROLLING METHOD

The entire disclosure of Japanese Patent Application No. 2012-271114, filed Dec. 12, 2012 is expressly incorporated by reference herein.

BACKGROUND

1. Technical Field

The present invention relates to a projector and a projector controlling method.

2. Related Art

In a projector that projects an image to be projected, a state in which the projector remains powered on is classified into tire following two states: an in-use state in which a user is using the projector; and a non-use state in which the user is not using the projector.

Conceivable examples of the case where the projector is in the in-use state may include a case where the projector is projecting images to be projected (motion images and still images) based, for example, on an external signal and a case where the user is operating the projector.

Further, conceivable examples of the case where the projector is in the non-use state may include a case where a signal or any other form of information is not externally inputted and the user is not operating the projector and a case where the user temporarily stops projecting motion images to be projected and leaves the projector powered on.

The projector in the non-use state is, so to speak, an apparatus that simply projects meaningless light. When the proportion of the non-use state is large, unnecessary electric power is undesirably consumed and the life of each component that forms the projector (life of light source section that outputs light, in particular) is undesirably wasted.

In view of the circumstances described above, as a projector having a function of reducing unnecessary power consumption and preventing the life of each component that forms the projector from being wasted, a projector that measures an accumulated period of the non-use state and acquires other types of information and displays them has been developed (see JP-A-2G12-132977, tor example). The projector of the related art is intended to solve the problems of unnecessary power consumption and waste of the life of each component that forms the projector (life of light source section that outputs light, in particular).

To solve the problems described above, the projector of the related art essentially requires user's active actions operation performed by user themselves), such as reviewing a method for using the projector based on the displayed information and changing the setting of the projector. Therefore, the problems described above cannot be solved unless the user takes active actions.

SUMMARY

An advantage of some aspects of the invention is to provide a projector having a function of reducing unnecessary power consumption and preventing the life of each component that forms the projector irons being wasted and capable of providing the function without essentially requiring user's active actions. Another advantage of some aspects of the invention is to provide a projector controlling method that allows a function of reducing unnecessary power consumption and preventing the life of each component that forms the projector from being wasted to be provided without essentially requiring user's active actions.

[1] A projector according to an aspect of the invention includes a measurement unit having a function of measuring periods and a control unit having a function of determining an in-use state ratio or a non-use stare ratio based on the measured periods and a function of executing an energy saving setting. The projector thus has a function of reducing the amount of unnecessary power consumption and preventing the life of each portion that forms the projector from being wasted without essentially requiring a user to take active actions.

The energy saving setting may be a predetermined action setting or an action setting automatically created by the projector (control unit) in accordance with user's actual usage of the projector. In the former case, the projector preferably includes a storage unit having a function of storing the energy saving setting.

Whether the projector is in the in-use state or the non-use state can be judged by the control unit baaed on a variety of judgment factors. Examples of the variety of judgment factors may include whether or not an external signal and other forms of information are inputted, states of linage projection and audio reproduction, the state of a shutter that blocks light having exited out of a projection system, the state of an AV mute function, the illuminance in the surrounding environment, and the state of the user or a viewer.

[2] In the projector according to the aspect of the invention, it is preferable that the energy saving setting causes the projector to be powered off after the non-use state continues for a specified period.

The configuration described above can reduce the amount of unnecessary power consumption and prevent the life of each portion that forms the projector from being wasted.

[3] It is preferable that the projector according to the aspect of the invention further includes a light source section that outputs light, and the energy saving setting preferably causes the luminance of light from the light source section to lower in the non-use state.

The configuration described above can reduce the amount of unnecessary power consumption and prevent the life of each portion that, forms the projector from being wasted. In the projector according to the aspect of the invention, it is preferable that the energy saving setting is formed of a plurality of energy saving settings that achieve different degrees of energy saving, and the control unit has a function of selecting one of the plurality of energy saving settings in accordance with the in-use state ratio or the non-use state ratio and executing the selected energy saving setting.

[4] The configuration described above can make an appropriate energy saving setting according to actual usage of the projector effective.

Examples of the plurality of energy saving settings that achieve different degrees of energy saving may include a period for which the non-use state continues and after which the projector is powered oft (the period is longer, for example, in the order of 5 minutes, 10 minutes, and 30 minutes when the in-use state ratio is greater or the non-use state ratio is smaller) and the degree of reduction in the luminance of light from the light source section in the non-use state.

Further, the plurality of energy saving settings may be formed of combinations of a plurality of settings (see each embodiment described later).

It is preferable that the projector according to the aspect of the invention further includes a storage unit having a function of storing the periods measured by the measurement unit.

The configuration described above allows the tendency of bow the user uses the projector to foe stored for more accurate understanding of actual usage of the projector and reflection of the actual usage in the energy saving setting.

The storage unit in the projector according to the aspect of the invention may have only the function described above or may have a function other than the function described above or may even be a general-purpose storage unit having the function described above.

[6] In the projector according to the aspect of the invention, it is preferable that the storage unit further has a function of separately storing the in-use state ratios or the non-use state ratios associated with a plurality of users, and the control unit has a function of executing the energy saving setting based on the in-use state ratio or the non-use state ratio associated with the user who is using the projector.

The configuration described above allows detection of actual usage of the projector on a user basis and selection of an energy saving setting according to the user who is using the projector even when a plurality of users use the single projector.

A mechanism for identifying the user who is using the projector can be a variety of mechanisms. Examples of the mechanisms may include a mechanism in which a profile is created on a user basis and a profile is selected when the projector is powered on and a mechanism in which the projector (control unit) performs user identification based on the tendency of how the user uses the projector, details of an input signal, and other types of information.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector and a projector controlling method according to embodiments of the invention will be described below. In the embodiments and drawings, components that do not directly relate to the invention will not basically be described or illustrated.

First Embodiment

Figure 1:
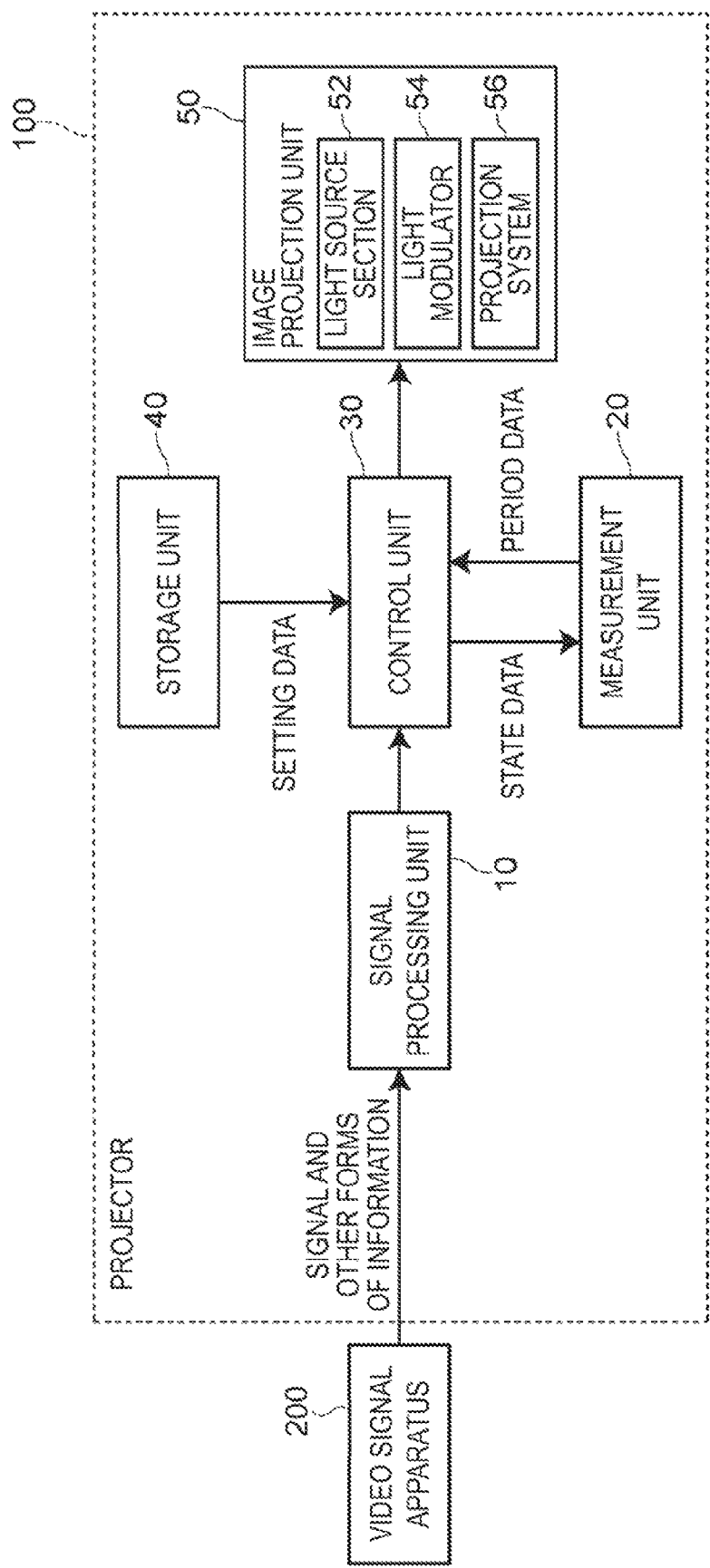
FIG. 1 diagrammatically shows the configuration of a projector according to a first embodiment.

FIG. 1 diagrammatically shows the configuration of a projector 100 according to a first embodiment. The arrows in FIG. 1 schematically show the flow of information between components of the projector 100. The same holds true for FIGS. 3 and 5, which will be described later.

Figure 2:
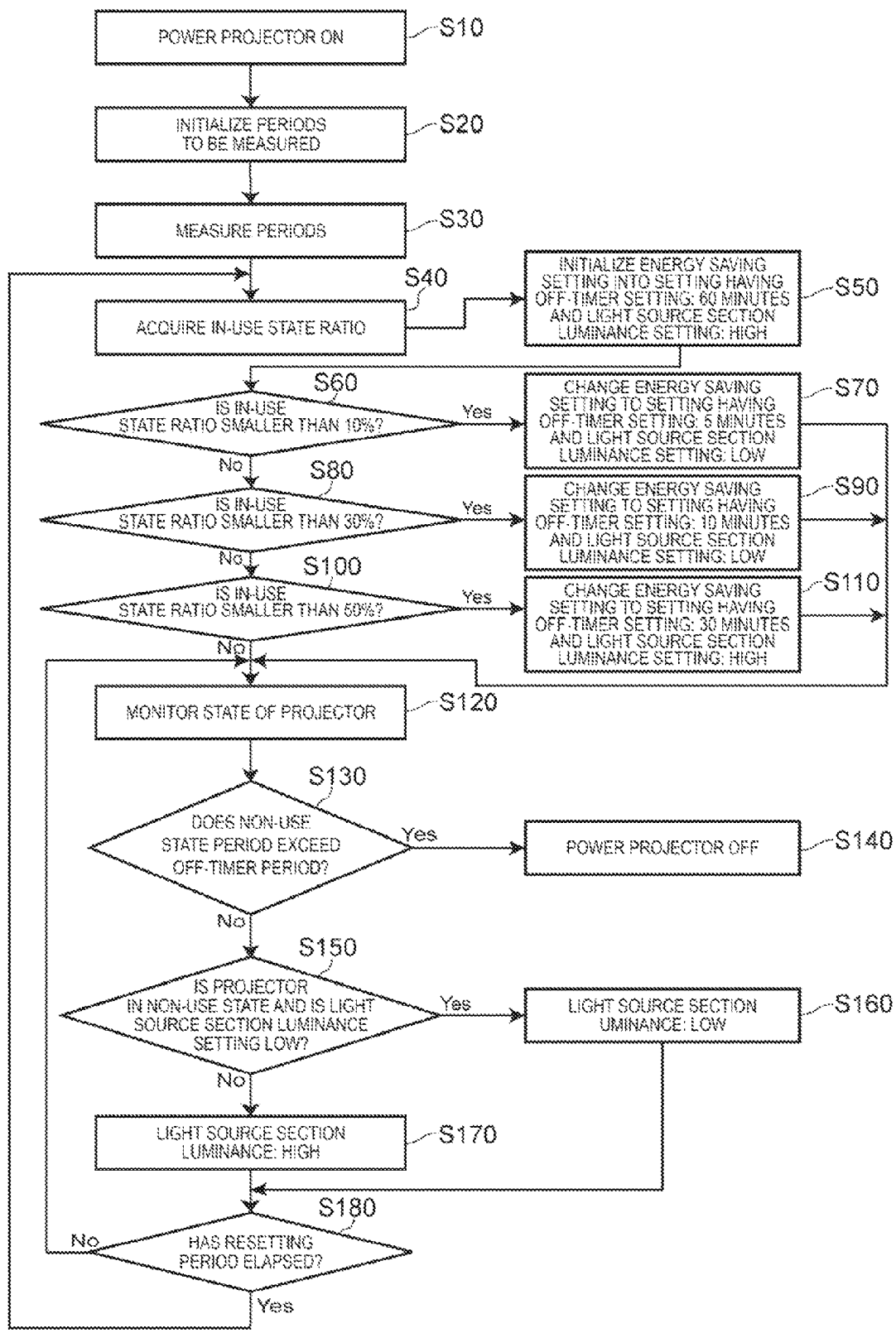
FIG. 2 is a flowchart of a projector controlling method according to the first embodiment.

FIG. 2 is a flowchart of a projector controlling method according to the first embodiment. "Light source section luminance setting" in FIG. 2 means "the setting of light source section luminance in a non-use state," and "light source section luminance" means "the state of the luminance of light from a light source section." The same holds true for FIGS. 4 and 6, which will be described later.

The configuration of the projector 100 according to the first embodiment will first be described.

The projector 100 measures a variety of periods whenever the projector 100 is powered on and selects an energy saving setting based on the periods.

The projector 100 includes a signal processing unit 10, a measurement unit 20, a control unit 30, a storage unit 40, and an image projection unit 50, as shown in FIG. 1. A video signal apparatus 200 shown in FIG. 1 is an apparatus (video player, for example) that inputs a signal used to project an image to be projected into the projector 100 and is not an element that forms the projector 100 according to the first embodiment.

The signal processing unit 10 processes the signal from the video signal apparatus 200 in such a way that the processed signal has a format that can be readily handled in transfer operation in the projector 100.

The measurement unit 20 has a function of measuring a period during which the projector 100 remains powered on and a period of an in-use state in which a user is using the projector 100. The measured periods are sent as period data to the control unit 30 as appropriate. The measurement unit 20 receives state data representing whether or not the projector 100 is currently in use or not from the control unit 30.

The control unit 30 is a set of CPU and other computing devices and has a function of determining the ratio of the in-use state period to the period during which the projector 100 remains powered on (in-use state ratio) based on the periods measured by the measurement unit 20 and a function of executing an energy saving setting based on the in-use state ratio. The control unit 30 further has a function of judging whether the projector 100 is in the in-use state or the non-use state based on a variety of judgment factors.

Examples of the variety of judgment factors may include whether or not an external signal and other forms of information are inputted (when signal input is terminated, it is judged that the projector enters the non-use state), states of image projection, and audio reproduction (when image projection and audio reproduction are temporarily terminated, it is judged that the projector enters the non-use state), the open/closed state of a shutter that can be closed to block light having exited out of a projection system (when the shutter is closed, it is judged that the projector enters the non-use state), and the on/off state of an AV mute function (when the AV mute function is turned on, it is judged that the projector enters the non-use state). Further, a photo-sensor provided in the projector is used to measure the illuminance in the surrounding environment and it is judged that the projector enters the non-use state when the surrounding environment changes to low illuminance. When a motion sensor or any other similar sensor is provided, the motion sensor detects whether or not the user or a viewer is present in the vicinity of the projector, and it is judged that the projector enters the non-use state when a user or a viewer moves away from the projector.

Further, the energy saving setting is formed of a plurality of energy saving settings that achieve different degrees of energy saving. In the first embodiment, the energy saving settings are combinations of the following two settings: a first setting that causes the projector 100 to be powered off after the non-use state, in which the user is not using the projector 100, continues for a specified period (what is called an off-timer setting); and a second setting that causes the luminance of light from a light source section 52, which will be described later, to be lowered in the non-use state.

Although it will be described later in details, the plurality of energy saving settings in the first embodiment are formed of the following four types in the descending order of the degree of energy saving (readiness of restoration of in-use state).

(energy saving mode 1) "off-timer setting: 60 minutes (the projector is powered off after it is judged that the projector is in the non-use state and the non-use state continues for a specified period of 60 minutes) and light source section luminance setting in non-use state: high (the luminance of light from a light source remains high even when it is judged that the projector is in the non-use state)" (the setting is hereinafter referred to as an initial setting)

(energy saving mode 2) "off-timer setting: 30 minutes (the projector is powered off after it is judged that the projector is in the non-use state and the non-use state continues for a specified period of 30 minutes) and light source section luminance setting in non-use state: high (the luminance of light from the light source remains high even when it is judged that the projector is in the non-use state)"

(energy saving mode 3) "off-timer setting: 10 minutes (the projector is powered off after it is judged that the projector is in the non-use state and the non-use state continues for a specified period of 10 minutes) and light source section luminance setting in non-use state: low (the luminance of light from the light source is set to be low when it is judged that the projector is in the non-use state)"

(energy saving mode 4) "off-timer setting: 5 minutes (the projector is powered off after it is judged that the projector is in the non-use state and the non-use state continues for a specified period of 5 minutes) and light source section luminance setting in non-use state: low (the luminance of light from the light source is set to foe low when it is judged that the projector is in the non-use state)"

The control unit 30 further has a function of selecting and executing one of the plurality of energy saving settings in accordance with the in-use state ratio. In more details, the control unit 30 classifies the in-use state ratio (in-use state period ratio in a period during which the projector remains powered on) into in-use state ratios greater than or equal to 50%, smaller than 50% but greater than or equal to 30%, smaller than 30% but greater than or equal to 10%, and smaller than 10% and selects and executes an energy saving setting according to a situation in question.

The storage unit 40 has a function of storing the energy saving settings, each of which is a predetermined action setting, as setting data. The setting data is sent to the control unit 30 as appropriate.

The image projection unit 50 includes a light source section 52, a light modulator 54, and a projection system 56.

The light source section 52 emits light. The light source section 52 is formed, for example, of a metal halide lamp, a high-pressure mercury lamp, or an ultra-high-pressure mercury lamp. The light source section may, for example, be formed of a light emitting diode (LED), a laser diode (LD), or an organic EL (OLED).

The light modulator 54 includes a light modulation device that modulates light from the light source section 52 based on image information to be displayed. The light modulator 54 can be what is called a liquid crystal light modulation device, what is called a micromirror light modulation device, end a variety of other light modulation devices.

The projection system 56 projects the light modulated by the light modulator 54 as an image to be projected.

A description will next be made of a projector controlling method according to the first embodiment.

The projector controlling method according to the first embodiment is a projector control method using the projector 100.

First, when the projector 100 is powered on (step S10), the measurement unit 20 initializes the periods to be measured (step S20) and measures the period during which the projector 100 remains powered on and the period of the in-use state, in which the user is using the projector 100 (step S30).

The period data described above are then sent from the measurement unit 20 to the control unit 30. The control unit 30 determines and acquires the ratio of the in-use state period to the period during with the projector remains powered on (in-use state ratio) based on the measured periods (step S40).

The control unit 30 then initializes the energy saving setting into the initial setting (energy saving mode 1) having "off-timer setting: 60 minutes and light source section luminance setting in non-use state: high" (step S50) and selects one of the plurality of energy saving settings in accordance with the in-use state ratio.

To select an appropriate energy saving setting, it is first judged whether or not the in-use state ratio is smaller than 10% (step S60). When the in-use state ratio is smaller than 10%, the energy saving setting is changed to the highest-degree energy saving setting having "off-timer setting: 5 minutes and light source section luminance setting in non-use state: low" (energy saving mode 4) (step S70), and the control proceeds to the step of monitoring the state of the projector 100 (step S120, which will be described later).

When the in-use state ratio is greater than or equal to 10%, it is further judged whether or not the in-use state ratio is smaller than 30% (step 380). When the in-use state ratio is smaller than 30%, the energy saving setting is changed to the setting having "off-timer setting: 10 minutes and light source section luminance setting in non-use state: low" (energy saving mode 3) (step S90), and the control proceeds to the step of monitoring the state of the projector 100 (step S120).

When the in-use state ratio is greater than or equal to 30%, if is further judged whether or not the in-use state ratio is smaller than 50% (step S100). When the in-use state ratio is smaller than 30%, the energy saving setting is changed to the setting having "off-timer setting: 30 minutes and light source section luminance setting in non-use state: high" (energy saving mode 2) (step S110), and the control proceeds to the step of monitoring the state of the projector 100 (step S120).

When the in-use state ratio is greater than or equal to 50%, the initial setting (energy saving mode 1) is maintained.

After an energy saving setting is selected, whether the projector 100 is in the in-use state or the non-use state is monitored (step S120). The state of the projector 100 is judged by the control unit 30 based on the variety of judgment factors described above.

Thereafter, the step of executing the energy saving setting is carried out based on the in-use state ratio. Specifically, the following steps are carried out: That is, it is judged whether or not the period for which the non-use state has continued exceeds the off-timer setting period (60 minutes in energy saving mode 1, 30 minutes in energy saving mode 2, 10 minutes in energy saving mode 3, and 3 minutes in energy saving mode 4) (step S130). When the period for which the non-use state has continued exceeds the off-timer setting period, the projector 100 is powered off (step S140).

When the period for which the non-use state has continued does not exceed the off-timer setting period, it is judged whether or not the projector 100 is currently in the non-use state and the light source section luminance setting in the non-use state is low (step S150). When the projector 100 is in the non-use state and the light source section luminance setting in the non-use state is low (when the con-use state has continued for a period shorter than 5 minutes in the energy saving mode 4 or when the non-use state has continued for a period shorter than 10 minutes in the energy saving mode 3), the luminance of light from the light source section is lowered, (step S160). In other cases (when the non-use state has continued for a period shorter than 30 minutes in the energy saving mode 2 or when the non-use state has continued for a period shorter than 60 minutes in the energy saving mode 1), the luminance of light from the light source section is maintained high (step S170).

After the step of executing the energy saving setting is completed, it is judged whether or not the period from the time at which the setting was executed last time to the present becomes equal to a resetting period (step S180). The resetting period is a period after which the in-use state ratio is determined again and an appropriate energy saving setting is selected again. The resetting period can, for example, be 5 minutes but not necessarily limited to this for the invention and can be an arbitrary period.

When the resetting period has not elapsed, the control returns to the step of monitoring the state of the projector 100 (step S120).

When the resetting period has elapsed, the control returns to the stop of determining the in-use state ratio based on the measured periods and acquiring the determined in-use state ratio (step S40).

Second Embodiment

Figure 3:
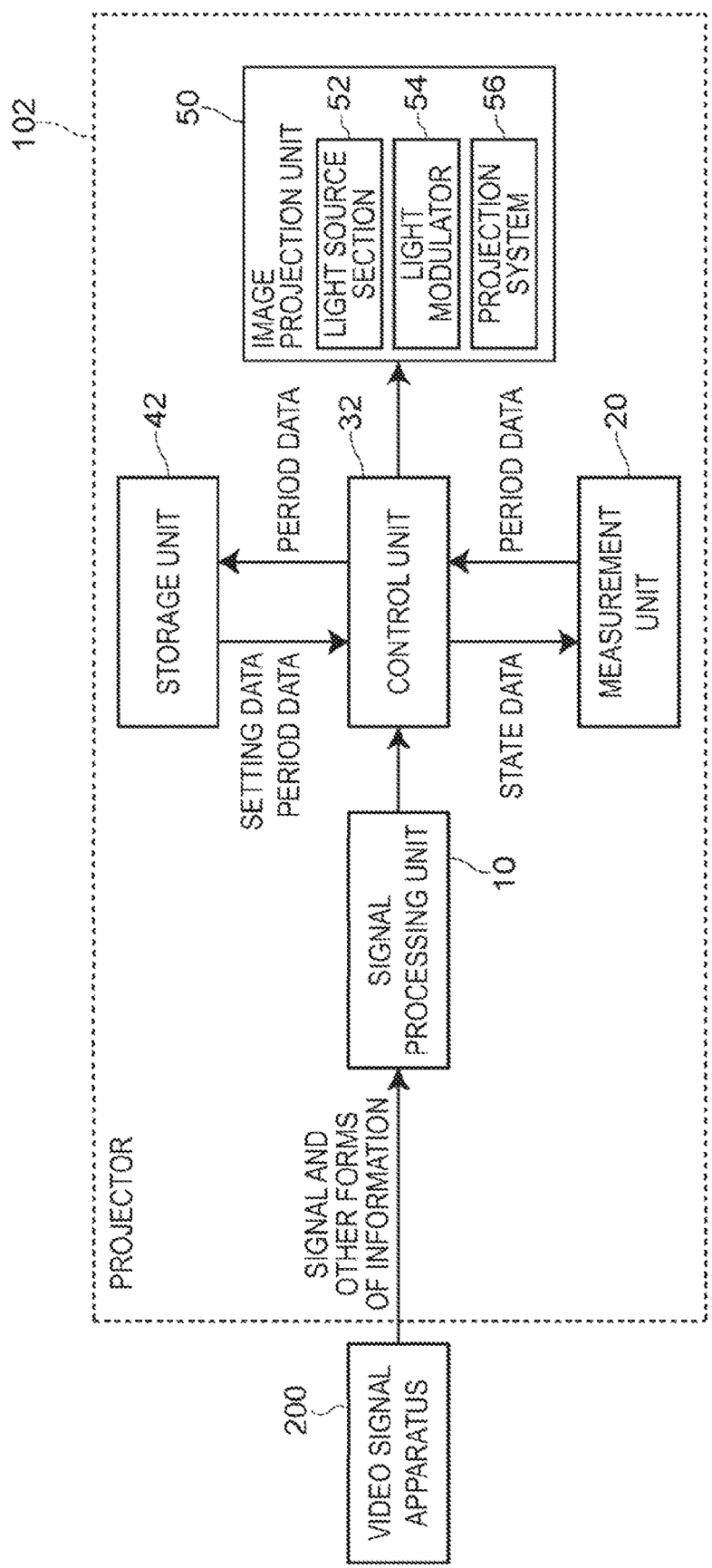
FIG. 3 diagrammatically shows the configuration of a projector according to a second embodiment.

FIG. 3 diagrammatically shows the configuration of a projector 102 according to a second embodiment.

Figure 4:
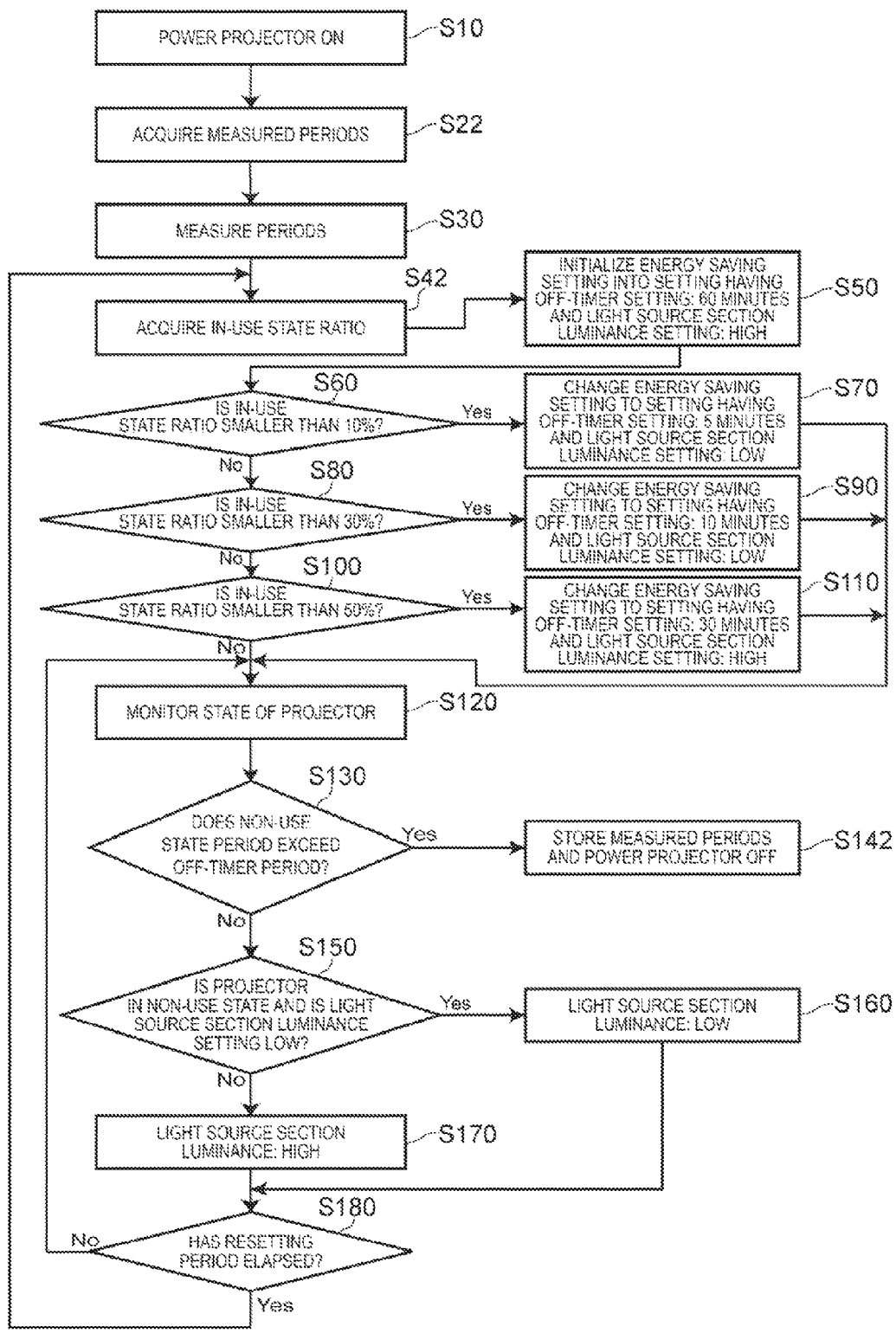
FIG. 4 is a flowchart of a projector controlling method according to the second embodiment.

FIG. 4 is a flowchart of a projector controlling method according to the second embodiment.

The configuration of the projector 102 according to the second embodiment will first foe described.

The projector 102 measures the sum of the variety of periods having elapsed after the user starts using the projector and selects an energy saving setting based on the periods.

The projector 102 according to the second embodiment basically has the same configuration as that of the projector 100 according to the first embodiment but differs therefrom in terms of the configurations of the control unit and the storage unit, as shown in FIG. 3. The components different from those of the projector 100 according to the first embodiment will be described below.

A control unit 32 basically has the same configuration and function as those of the control unit 30 in the first embodiment but differs therefrom in that the control unit 32 uses the sum of the periods measured by the measurement unit 20 when determining the in-use state ratio. The control unit 32 acquires "the period during which the projector 102 remains powered on and the period of the in-use state" measured when the projector 102 was powered off last time and determines the in-use state ratio based on the acquired periods in conjunction with the periods measured by the measurement unit 20.

A storage unit 42 basically has the same configuration and function as those of the storage unit 40 in the first embodiment but differs therefrom in that the storage unit 42 further has a function of storing the periods measured by the measurement unit 20. When the projector 102 is powered off, the storage unit 42 stores "the period during which the projector 102 remains powered on and the period of the in-use state" measured by the measurement unit 20.

A projector controlling method according to the second embodiment will next be described.

The projector controlling method according to the second, embodiment is a projector controlling method using the projector 102.

The projector controlling method according to the second embodiment is basically the same as the method for controlling the projector 100 according to the first embodiment but differs from the projector controlling method according to the first embodiment in terms of part of the steps as shown in FIG. 4. The steps different from those in the projector controlling method according to the first embodiment (steps in FIG. 4 having names different from those in the first embodiment and steps having reference characters different therefrom) will be described below.

In the second embodiment, instead of the step of initializing the periods measured by the measurement unit 20 in the first embodiment (step S20, see FIG. 2), the step of acquiring from the storage unit 42 "the period during which the projector 102 remains powered on and the period of the in-use state" measured, when the projector 102 was powered off last time (step 322) is carried out.

Further, in the second embodiment, the control unit 32 acquires from the storage section 42 "the period during which, the projector 102 remains powered on and the period of the in-use state" measured when the projector 102 was powered off last time, determines the in-use state ratio based on the acquired periods in conjunction with the periods measured by the measurement unit 20, and acquires the determined in-use state ratio (step S42).

Still further, in the second embodiment, when the projector 102 is powered off, the storage unit 42 stores the measured periods or "the period during which the projector 102 remains powered on and the period of the in-use state." The same holds true for a case where the projector 102 is powered off when the period during which the projector remains in the non-use state exceeds the off-timer setting period (step S142).

As described above, the projector 102 according to the second embodiment differs from the projector 100 according to the first embodiment in terms of the configurations of the control unit and the storage unit but includes the measurement unit 20, which has the function of measuring the periods, and the control unit 32, which has the function of determining the in-use state ratio based on measured periods and the function of executing an energy saving setting, the projector 102 has the function of reducing the amount of unnecessary power consumption and preventing the life of each portion that forms the projector from being wasted and can perform the function without essentially requiring the user to take active actions, as in the projector 100 according to the first embodiment.

Further, the projector 102 according to the second embodiment, which includes the storage unit 42 having the function of storing the periods measured by the measurement unit 20, can store the tendency of how the user uses the projector for more accurate understanding of actual usage of the projector and reflection of the actual usage in the energy saving setting.

The projector 102 according to the second embodiment, which has the same configuration as that of the projector 100 according to the first embodiment except the configurations of the control unit and the storage unit, provides the relevant advantageous effects among those provided by the projector 100 according to the first embodiment.

As described above, the method for reducing electric power consumed by the projector according to the second embodiment differs from the method for reducing electric power consumed by the projector according to the first embodiment in terms of details of the steps but includes step S30 of measuring two periods, the period during which the projector 102 remains powered on and the in-use state period, step S42 of determining the in-use state ratio based on the measured periods, and steps S130 and S150 of executing a power saving setting based on the in-use state ratio. The method for reducing electric power consumed by the projector according to the second embodiment can therefore be a projector controlling method for performing the function of reducing the amount of unnecessary power consumption and preventing the life of each portion that, forms the projector from being wasted without essentially requiring the user to take active actions, as in the method for reducing electric power consumed by the projector according to the first embodiment.

Third Embodiment

Figure 5:
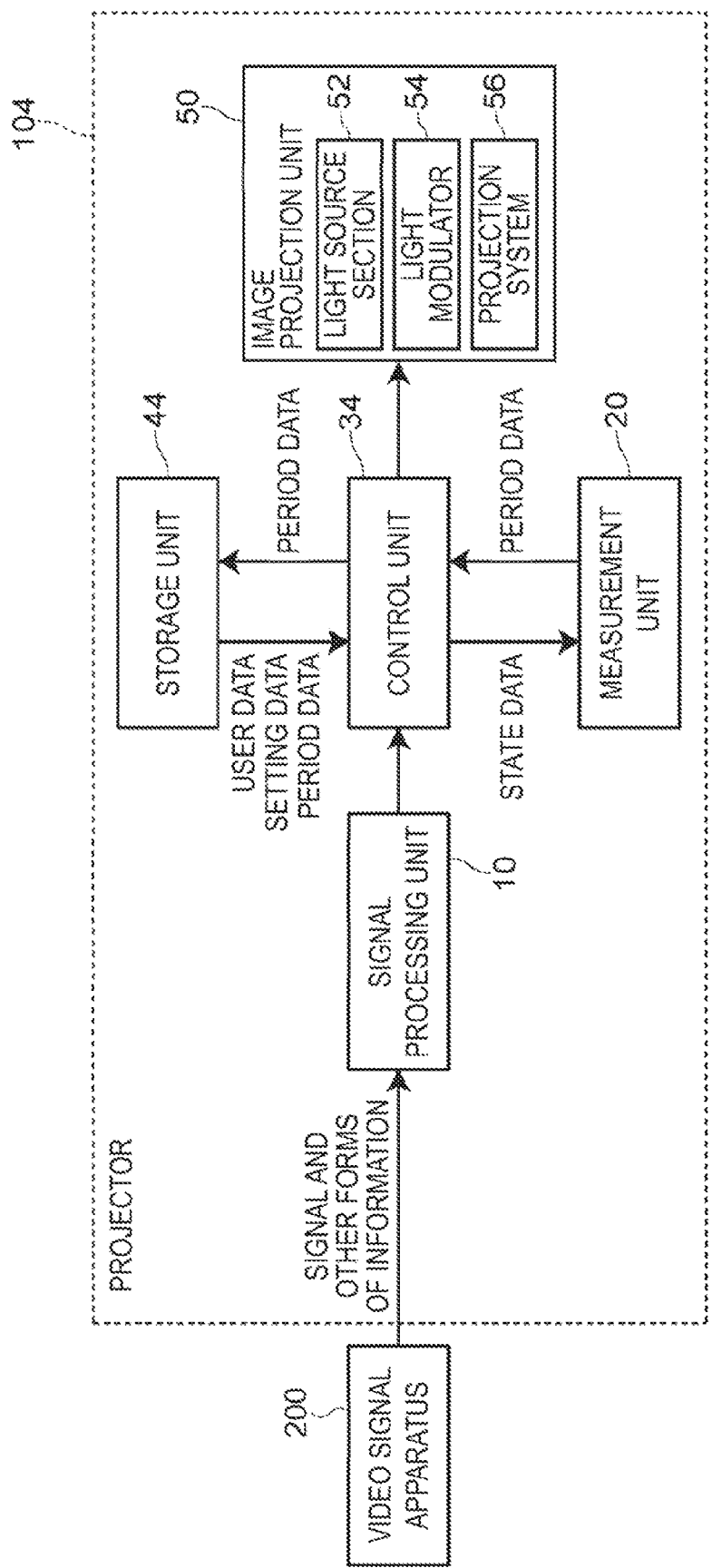
FIG. 5 diagrammatically shows the configuration of a projector according to a third embodiment.

FIG. 5 diagrammatically shows the configuration of a projector 104 according to a third embodiment.

Figure 6:
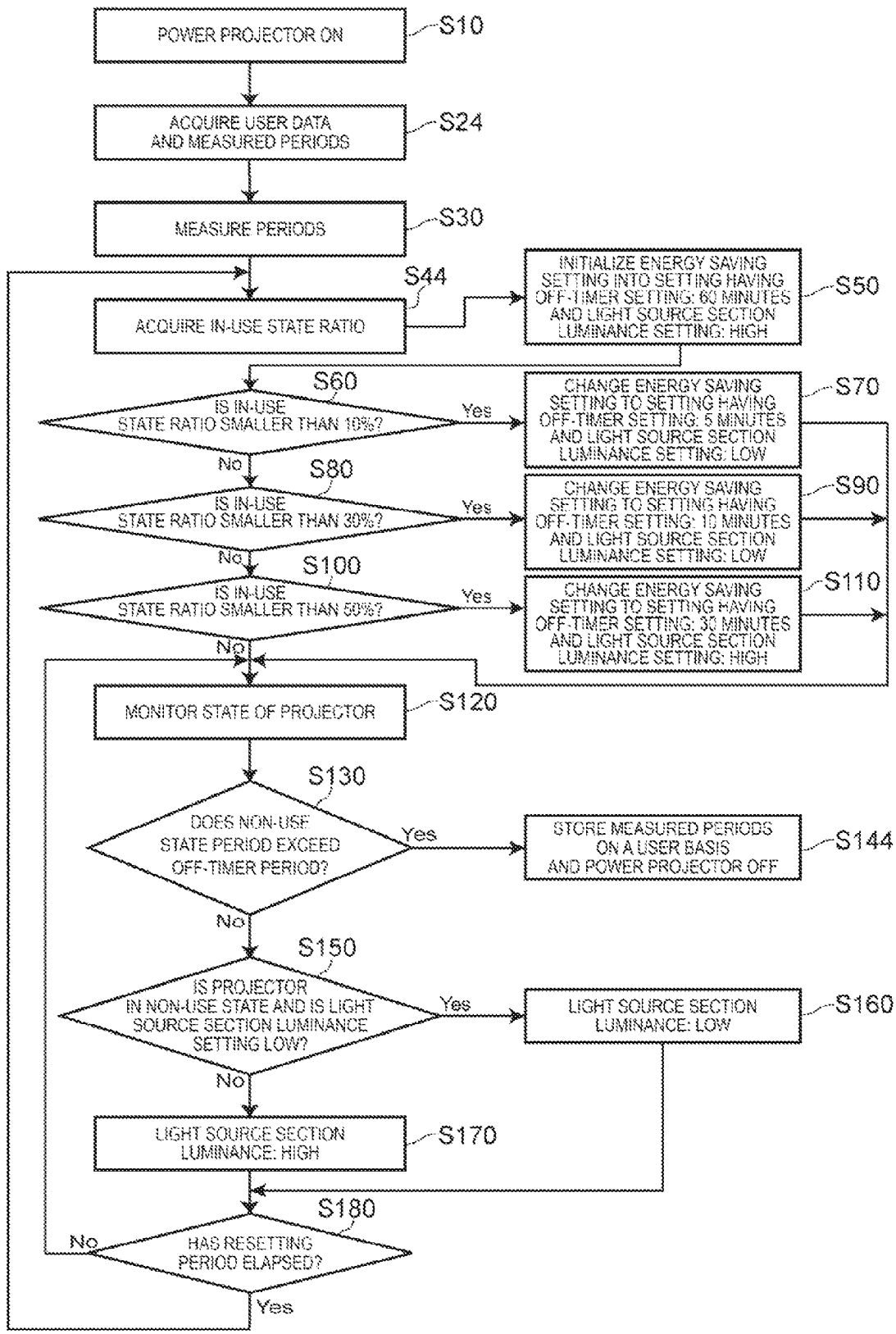
FIG. 6 is a flowchart of a projector controlling method according to the third embodiment.

FIG. 6 is a flowchart of a projector controlling method according to the third embodiment.

The configuration of the projector 104 according to the third embodiment will first be described.

The projector 104 stores data on a user basis and selects an energy saving setting based on the in-use state ratio associated with each user.

The projector 104 according to the third embodiment basically has the same configuration as that of the projector 102 according to the second, embodiment but differs therefrom in terms of the configurations of the control unit and the storage unit, as shown in FIG. 5. The components different from those of the projector 102 according to the second embodiment will, be described below.

A control unit 34 basically has the same configuration and function as those of the control unit 32 in the second embodiment and further has a function of executing an energy saving setting based on the in-use state ratio associated with a user who is using the projector 104. A mechanism for identifying the user who is using the projector 104 can be a variety of mechanisms. Examples of the mechanisms may include a mechanism in which a profile is created on a user basis and a profile is selected when the projector is powered on and a mechanism in which the control unit 34 performs user identification based on the tendency of how the user uses the projector 104, details of an input signal, and other types of information.

A storage unit 44 basically has the same configuration and function as those of the storage unit 42 in the second embodiment and further has a function of separately storing the in-use state ratios associated with a plurality of users. The storage unit 44 stores "the period during which the projector 104 remains powered on and the period of the in-use state" measured by the measurement unit 20 when the projector is powered off as user data on a user basis.

A projector controlling method, according to the third embodiment will next be described.

The projector controlling method according to the third embodiment is a projector controlling method, using the projector 104.

The projector controlling method according to the third embodiment is basically the same as the method according to the second embodiment but differs therefrom in terms of part of the steps as shown in FIG. 6. The steps different from those in the projector controlling method according to the second embodiment (steps in FIG. 6 having names different from those in the second embodiment and steps having reference characters different therefrom) will be described below.

In the third embodiment, the step of acquiring from the storage unit 44 "the period during which the projector 104 remains powered on and the period of the in-use state" associated with the user and measured when the projector 104 was powered off last time (step S24) is carried cut. Depending on the user identification mechanism (for example, when a profile is created on a user basis and a profile is selected when the projector is powered on), the step of identifying the user is preferably carried out before the step described above (step S24). When the control unit 34 performs user identification, if is also preferable that the user is identified in the step described above (step S24).

Further, in the third embodiment, the control unit 34 acquires from the storage section 44 "the period during which the projector 104 remains powered on and the period of the in-use state" measured when the user who is using the projector 104 powered off the projector 104 last time, determines the in-use state ratio based on the acquired periods in conjunction with the periods measured by the measurement unit 20, and acquires the determined in-use state ratio.

Still further, in the third, embodiment, when the projector 104 is powered off, the storage section 44 stores the measured periods on a user basis or "the period during which the projector 104 remains powered on and the period of the in-use state" associated with the user who is using the projector. The same holds true for a case where the projector 104 is powered off when the period during which the projector remains in the non-use state exceeds the off-timer setting period (step S144).

As described above, the projector 104 according to the third embodiment differs from the projector 102 according to the second embodiment in terms of the configurations of the control unit and the storage unit but includes the measurement unit 20, which has the function of measuring the periods, and the control unit 34, which has the function of determining the in-use state ratio based on measured periods and the function of executing an energy saving setting, the projector 104 has the function of reducing the amount of unnecessary power consumption and preventing the life of each portion that forms the projector from being wasted and can perform the function without essentially requiring the user to take active actions, as in the projector 102 according to the second embodiment.

Further, the projector 104 according to the third embodiment, which includes the storage unit 44 having the function of separately storing the in-use state ratios associated with a plurality of users and the control unit 34 having the function of executing an energy saving setting based on the in-use state ratio associated with the user who is using the projector 104, can detect actual usage of the projector on a user basis and select an energy saving setting according to the user who is using the projector even when a plurality of users use the single projector.

The projector 104 according to the third embodiment, which has the same configuration as that of the projector 102 according to the second embodiment except the configurations of the control unit and the storage unit, provides relevant advantageous effects among those provided by the projector 102 according to the second embodiment.

As described above, the method for reducing electric power consumed by the projector according to the third embodiment differs from the method for reducing electric power consumed by the projector according to the second embodiment in terms of details of the steps but includes step S30 of measuring two periods, the period during which the projector 104 remains powered on and the in-use state period, step S44 of determining the in-use state ratio based on the measured periods, and steps S130 and S150 of executing an energy saving setting based on the in-use state ratio. The method for reducing electric power consumed by the projector according to the third embodiment can therefore be a projector controlling method for performing the function of reducing the amount of unnecessary power consumption and preventing the life of each portion that forms the projector from being wasted without essentially requiring the user to take active actions, as in the method for reducing electric power consumed by the projector according to the second embodiment.

The invention has been described with reference to the embodiments described above, bet the invention is not limited thereto. The invention can foe implemented in a variety of other aspects to the extent that they do not depart from the substance of the invention. For example, the following variations are conceivable.

(1) The dimension, number, material, and shape of each of the components described in each of the embodiments have been presented by way of example and can be changed to the extent that the changes do not compromise the advantageous effects provided by the invention.

(2) In each of the embodiments described above, the measurement unit has the function of measuring the period during which the projector remains powered on and the period of the in-use state, but the invention is not necessarily configured this way. The measurement unit may have a function of measuring at least two of the period during which the projector remains powered on, the period of the in-use state, and the period of the non-use state.

(3) Each of the embodiments described above uses the step of measuring the period during which the projector remains powered on and the period of the in-use state, but the invention is not necessarily configured this way. The step of measuring at least two of the following periods can be used: the period during which the projector remains powered on; the period of the in-use state; and the period of the non-use state.

(4) In each of the embodiments described above, the in-use state ratio is determined and an energy saving setting is selected based on the in-use state ratio, but the invention is not necessarily configured this way. A non-use state ratio may be determined and an energy saving setting may be selected based on the non-use state ratio.

(5) In each of the embodiments described above, the following four types of energy saving setting are used: "off-timer setting: 60 minutes and light source section luminance setting in non-use state: high" (energy saving mode 1); "off-timer setting: 30 minutes and light source section luminance setting in non-use state: high" (energy saving mode 2); "off-timer setting: 10 minutes and light source section luminance setting in non-use state: low" (energy saving mode 3); and "off-timer setting: 5 minutes and light source section, luminance setting in non-use state: low" (energy saving mode 4), but the invention is not necessarily configured this way. The number of types of energy saving setting and detailed values in each of the energy saving settings can be adapted to a projector and a method for reducing electric power consumed by the projector to which the invention is applied.

What is claimed is:

1. A projector comprising:
a measurement unit having a function of measuring at least two of a period during which the projector remains powered on, a period of an in-use state in which a user is using the projector, and a period of a non-use state in which the user is not using the projector; and
a control unit having a function of determining an in-use state ratio that is the ratio of the period of the in-use state to the period during which the projector remains powered on or a non-use state ratio that is the ratio of the period of the non-use state to the period during which the projector remains powered on based on the periods measured by the measurement unit and a function of executing an energy saving setting based on the in-use state ratio or the non-use state ratio.

2. The projector according to claim 1,
wherein the energy saving setting causes the projector to be powered off after the non-use state continues for a specified period.

3. The projector according to claim 1,
further comprising a tight source section that outputs light,
wherein the energy saving setting causes the luminance of the light from the light source section to lower in the non-use state.

4. The projector according to claim 1,
wherein the energy saving setting is formed of a plurality of energy saving settings that achieve different degrees of energy saving, and
the control unit has a function of selecting one of the plurality of energy saving settings in accordance with the in-use state ratio or the non-use state ratio and executing the selected energy saving setting.

5. The projector according to claim 1,
further comprising a storage unit having a function of storing the periods measured by the measurement unit.

6. The projector according to claim 5,
wherein, the storage unit further has a function of separately storing the in-use state ratios or the non-use state ratios associated with a plurality of users, and
the control unit has a function of executing the energy saving setting based on the in-use state ratio or the non-use state ratio associated with the user who is using the projector.

7. The projector according to claim 4,
further comprising a storage unit having a function of storing the periods measured by the measurement unit,
wherein the storage unit further has a function of separately storing the in-use state ratios or the non-use state ratios associated with a plurality of users, and
the control unit has a function of executing the energy saving setting based on the in-use state ratio or the non-use state ratio associated with the user who is using the projector.

8. A projector controlling method comprising:
measuring at least two of a period during which the projector remains powered on, a period of an in-use state in which a user is using the projector, and a period of a non-use state in which the user is not using the projector;
determining an in-use state ratio that is the ratio of the period of the in-use state to the period during which the projector remains powered on or a non-use state ratio that is the ratio of the period of the non-use state to the period during which the projector remains powered on based en the measured periods; and
executing an energy saving setting based on the in-use state ratio or the non-use state ratio.

* * * * *